F. M. CARY.
HORSE HAY RAKE.
APPLICATION FILED JUNE 30, 1913.
1,230,863.
Patented June 26, 1917.
2 SHEETS—SHEET 2.
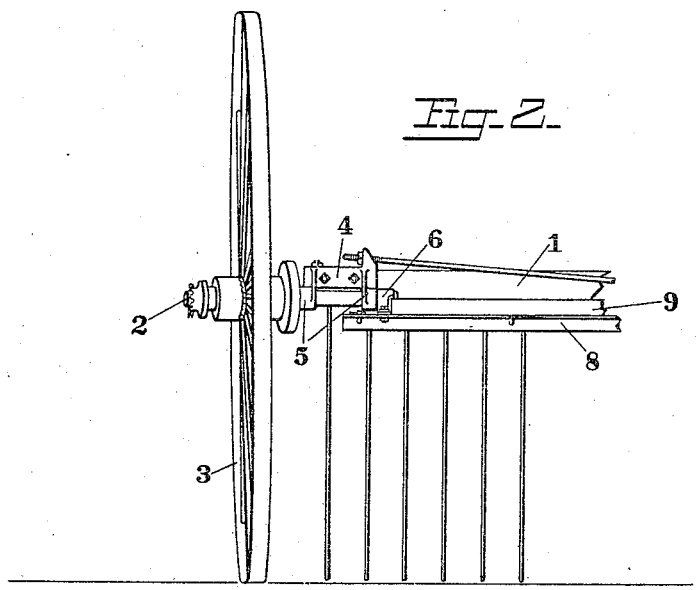
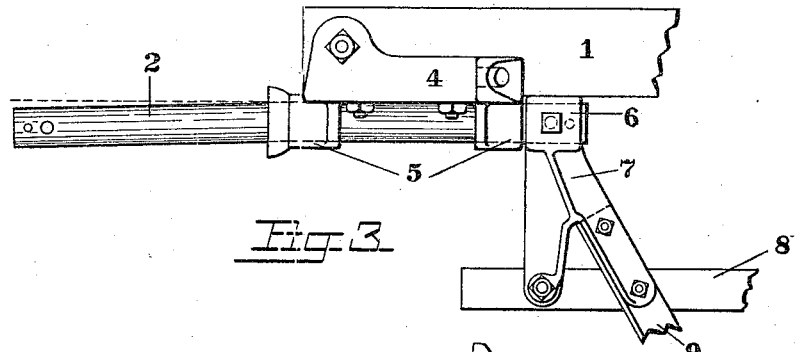
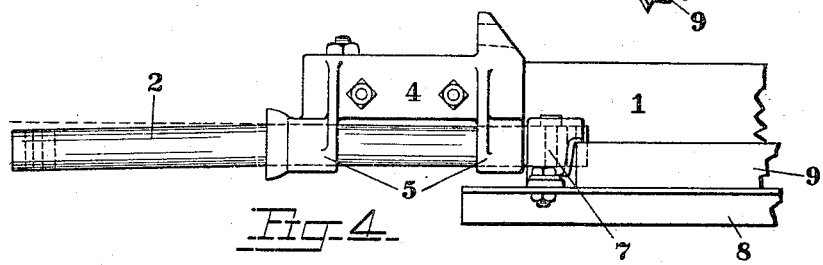

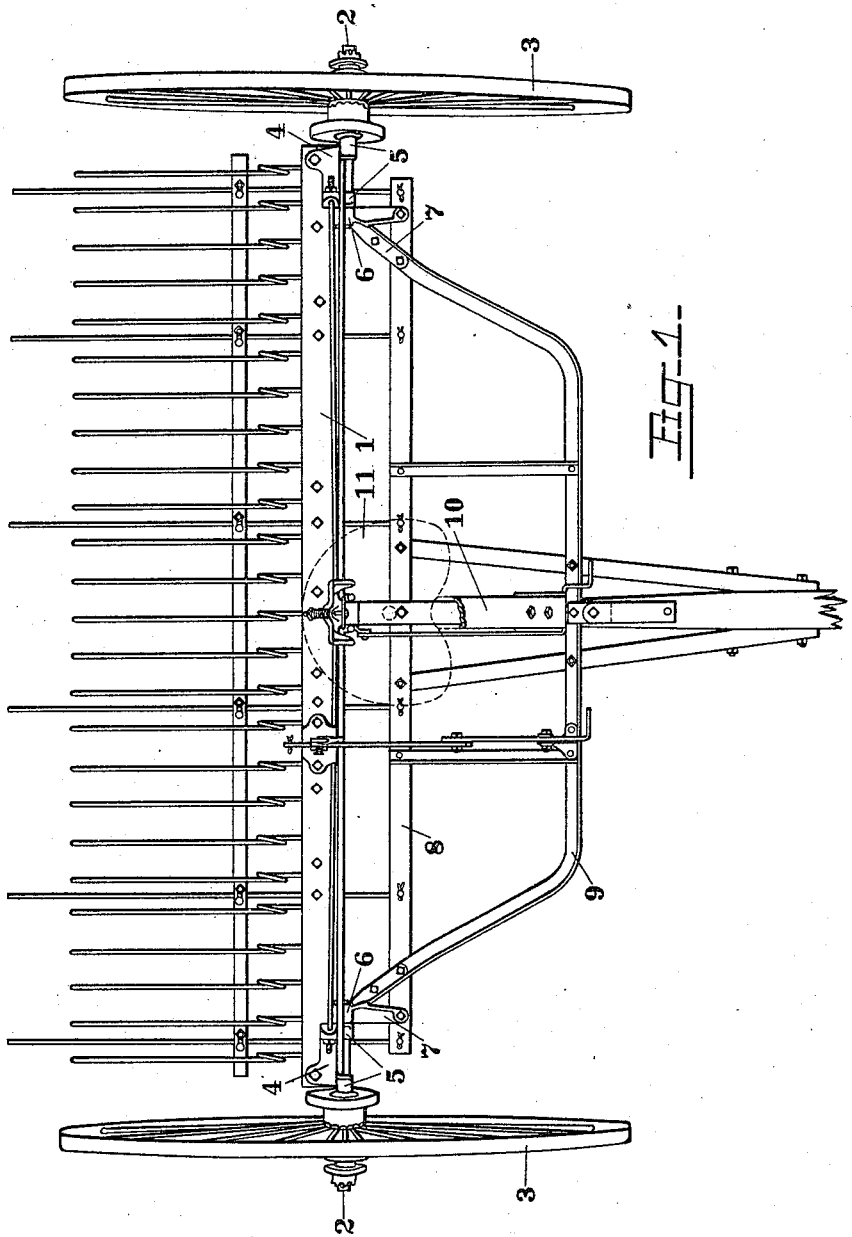

UNITED STATES PATENT OFFICE.

FRANCIS M. CARY, OF OTTUMWA, IOWA, ASSIGNOR, BY MESNE ASSIGNMENTS, TO DEERE & COMPANY, OF MOLINE, ILLINOIS, A CORPORATION OF ILLINOIS.

HORSE HAY-RAKE.

1,230,863.　　　　　Specification of Letters Patent.　　Patented June 26, 1917.

Application filed June 30, 1913.　Serial No. 776,663.

*To all whom it may concern:*

Be it known that I, FRANCIS M. CARY, a citizen of the United States, residing at Ottumwa, in the county of Wapello and State of Iowa, have invented certain new and useful Improvements in Horse Hay-Rakes, of which the following is a specification, reference being had therein to the accompanying drawing.

My invention relates to horse hay-rakes, and my object is to improve the construction thereof in such a manner as to increase the durability and efficiency of such implements.

Referring to the drawings in which similar numerals indicate identical parts—

Figure 1 is a plan view of a rake embodying my improvements. Fig. 2 is a front elevation of one end of the same. Figs. 3 and 4 are enlarged details.

In wheeled implements built with a view to lightness as well as efficiency, and having the mechanism between widely separated wheels, long or continuous use aided by the weight of the driver tends to cause a variation in the original stiffness of the connected parts and a spreading of the wheels, increasing the draft and impairing the efficiency of the implement; I overcome these defects by the construction shown in the drawings and hereinafter described.

I have shown a dump rake of a well known type in which a rake-head 1 is rockable on stub-axles 2 at both ends thereof, each stub-axle having mounted thereon a supporting wheel 3, and it is to the supporting wheels 3 and stub-axles 2 that my invention particularly relates. The rake-head 1 has secured to it at both ends castings 4 having bearings 5 through which a part of the stub-axles pass in parallel relation to the rake-head 1; the inner ends of the stub-axles are rigidly bolted in bearings 6 forming part of castings 7 which are secured to a bar 8 and to the ends of a bow-shaped frame 9 by suitable bolts. On the frame 9 is mounted the seat-bar 10 provided with a seat 11 shown in dotted lines in Fig. 1.

The stub-axles 2 are cambered, as shown more particularly in Figs. 3 and 4, but when mounted on the machine the portion in the bearings 5 are parallel with the rake-head 1, consequently the portion upon which the wheels 3 revolve is at an angle, the stub-axles being secured in the bearings 7 so that the outward portion projects downwardly and forwardly so that the wheels 3 are gathered in a forward and downward direction.

By this construction any tendency of the wheels to flare, because of long continued use and the weight of the driver, is corrected. I preferably make the stub axles 2 reversible end for end, both ends of each axle being provided with similar bolt and cotter holes, so that if the ends upon which the wheels revolve become worn, the stub-axles can be reversed and the wheels remounted on a more perfect bearing, the reversing of the stub-axles not altering the camber in any way.

What I claim is—

1. In a horse hay rake, the combination of a frame, a rake head, cambered stub axles secured on the frame and having a portion of their length parallel with the rake head and on which the rake head is supported, and supporting wheels on the stub axles having a gather by the camber thereof.

2. In a horse hay rake, the combination of a frame, a rake head, cambered stub axles secured on the frame and having a portion of their length parallel with the rake head and on which the latter is rockably supported, and supporting wheels on the stub axles having a forward gather by the camber thereof.

3. In a horse hay rake, the combination of a frame, a rake head, cambered stub axles secured on the frame and having a portion of their length parallel with the rake head, bearings on the rake head in which said portion is journaled whereby the rake head is rockable thereon, and supporting wheels on the stub axles having a forward gather by the camber thereof.

4. In a horse hay rake, the combination of a frame, a rake head, cambered reversible stub axles secured on the frame and having a portion of their length parallel with the rake head and on which the rake head is supported, and supporting wheels on the stub axles having a gather by the camber thereof.

In testimony whereof I affix my signature, in presence of two witnesses.

FRANCIS M. CARY.

Witnesses:
L. R. CLAUSEN,
F. M. WOODS.

Copies of this patent may be obtained for five cents each, by addressing the "Commissioner of Patents, Washington, D. C."